H. J. KEMPF.
WRAPPING MACHINE.
APPLICATION FILED JAN. 29, 1915.
1,200,365.
Patented Oct. 3, 1916.
6 SHEETS—SHEET 6.
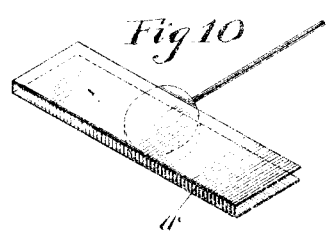
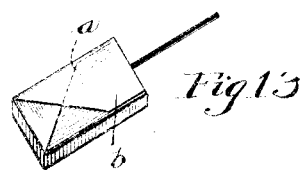
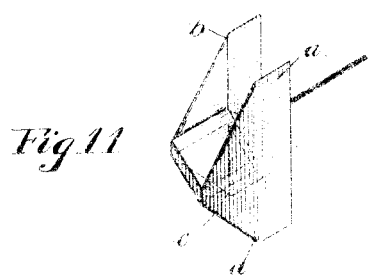
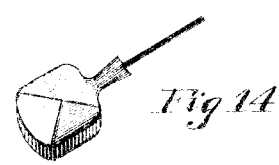
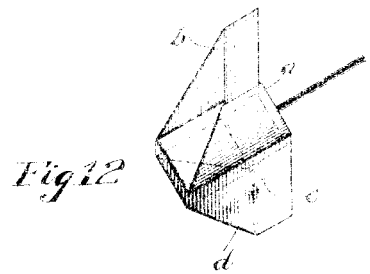
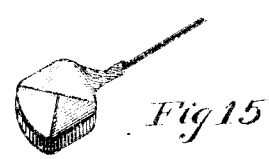
Witnesses
Inventor
Henry J. Kempf

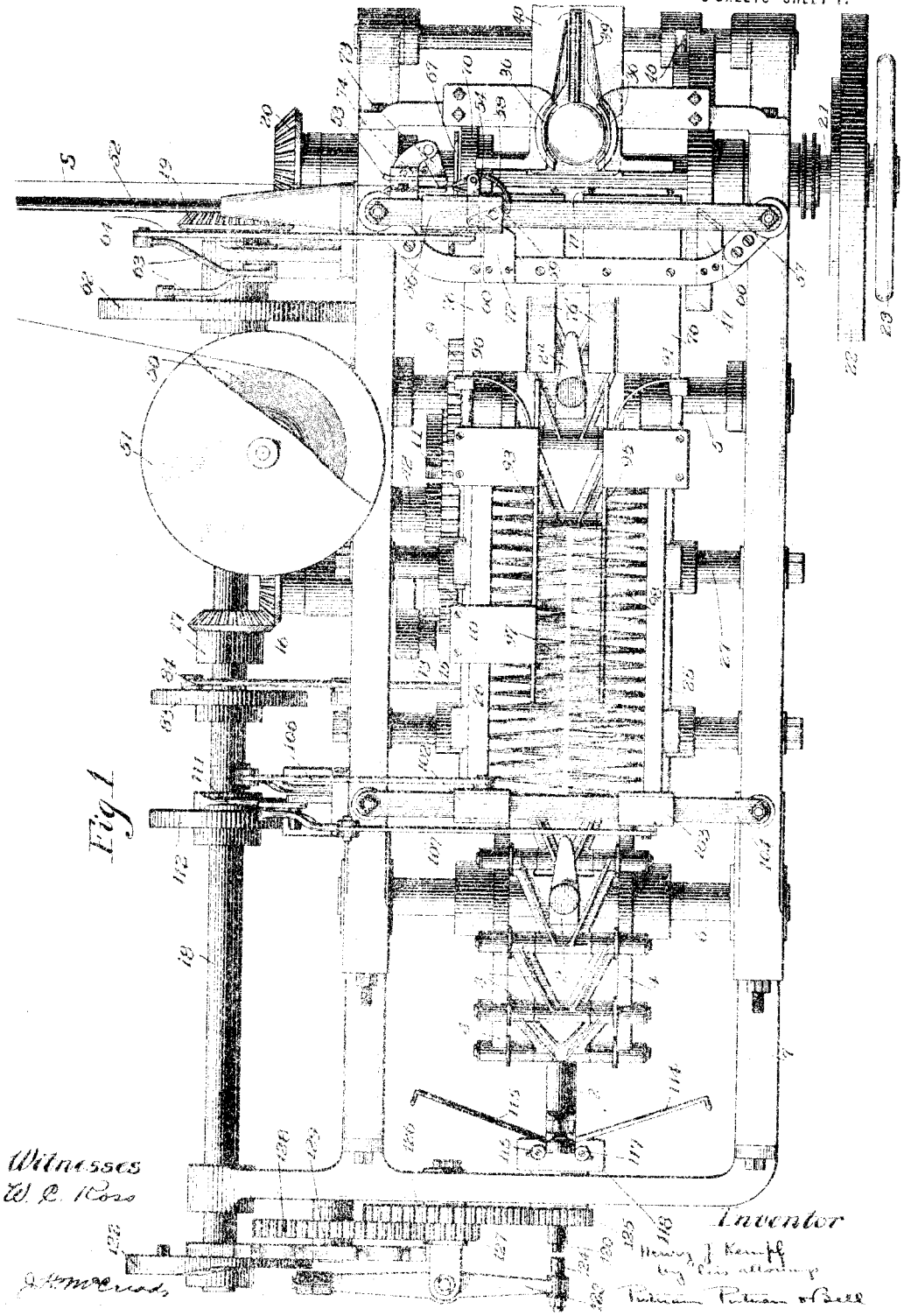

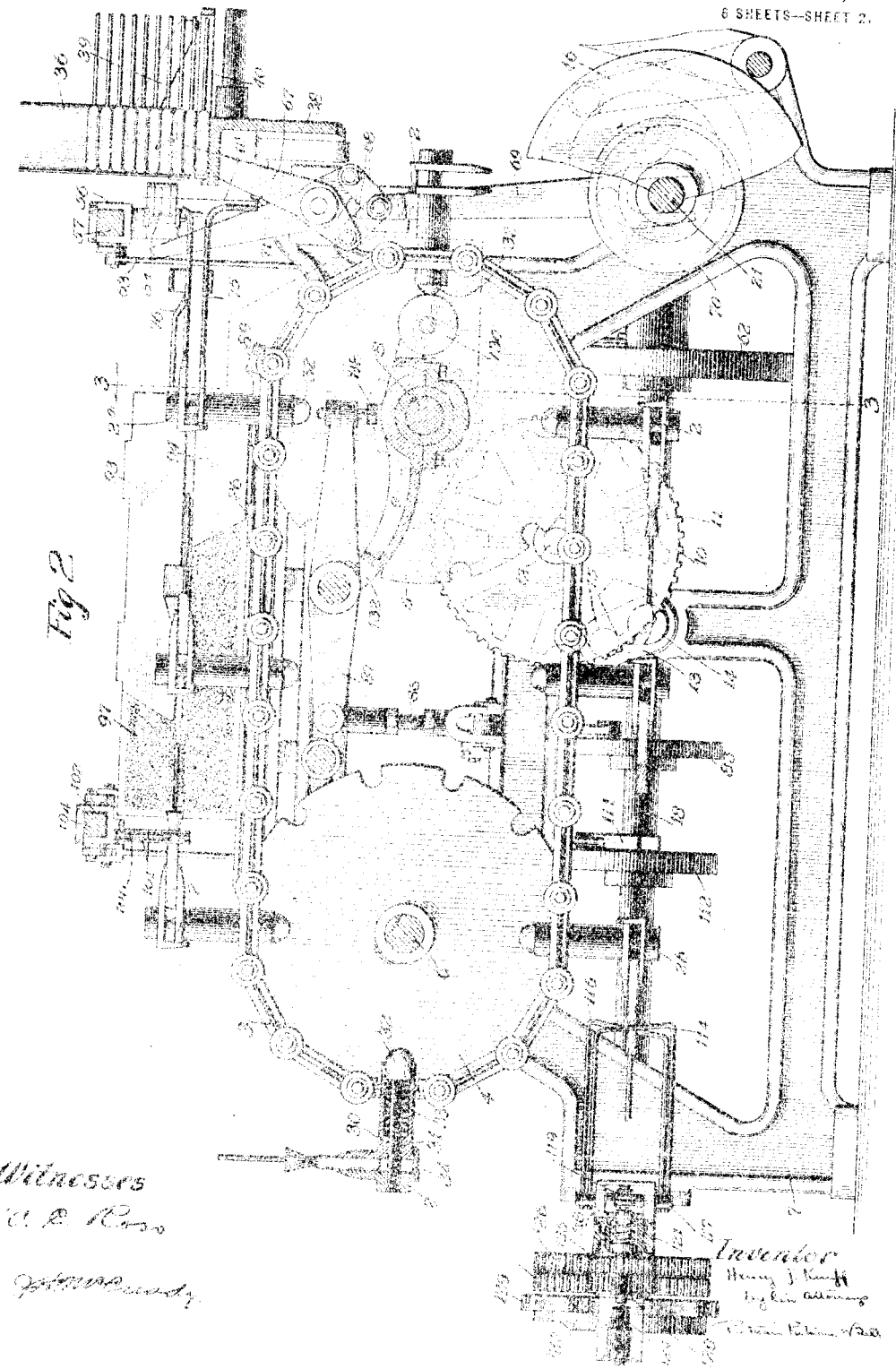

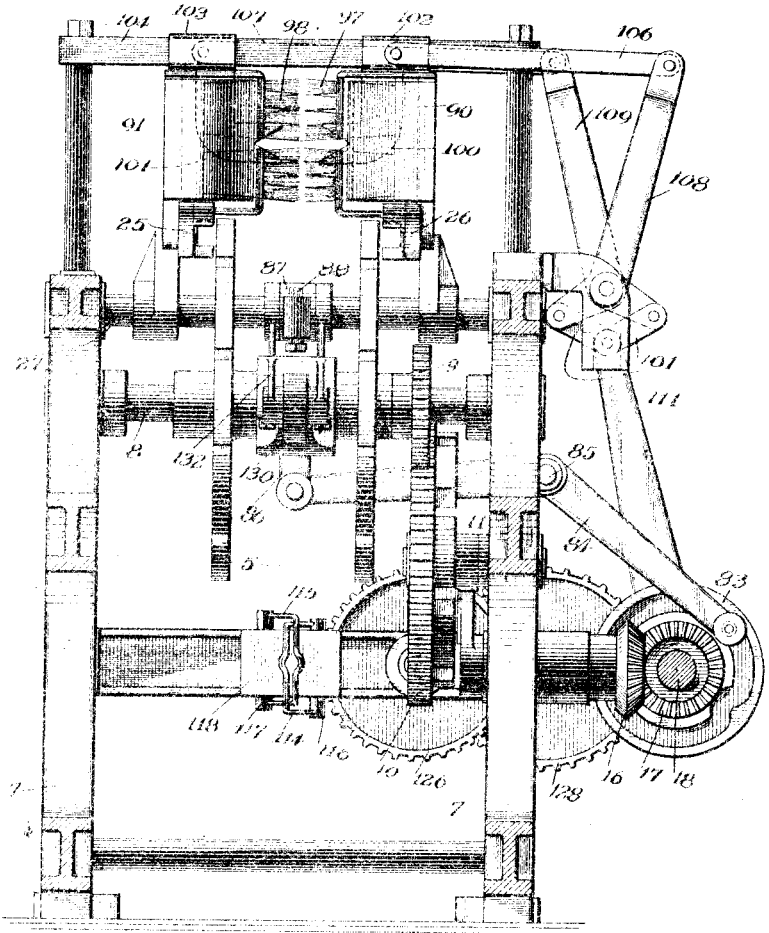

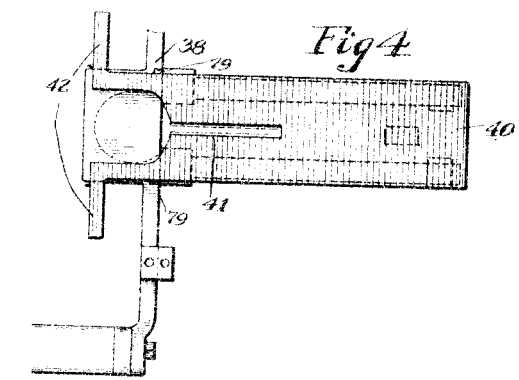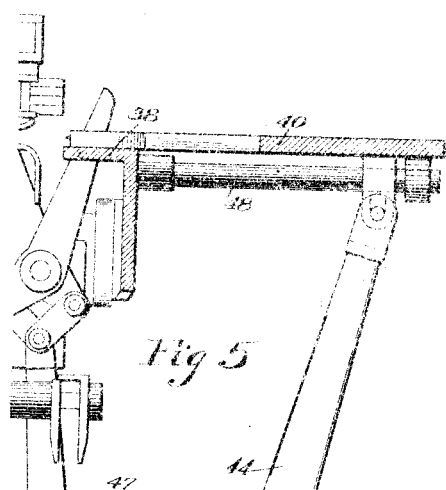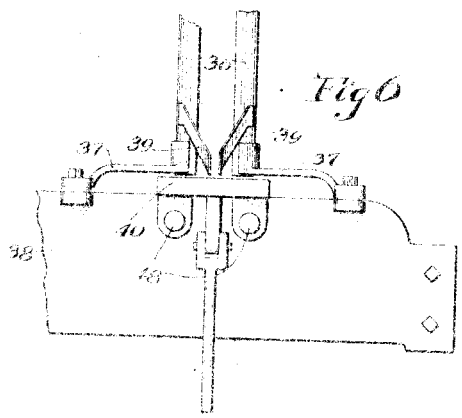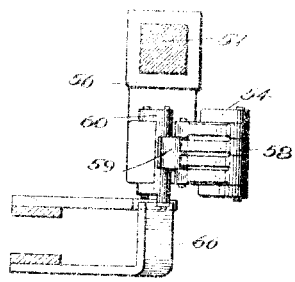

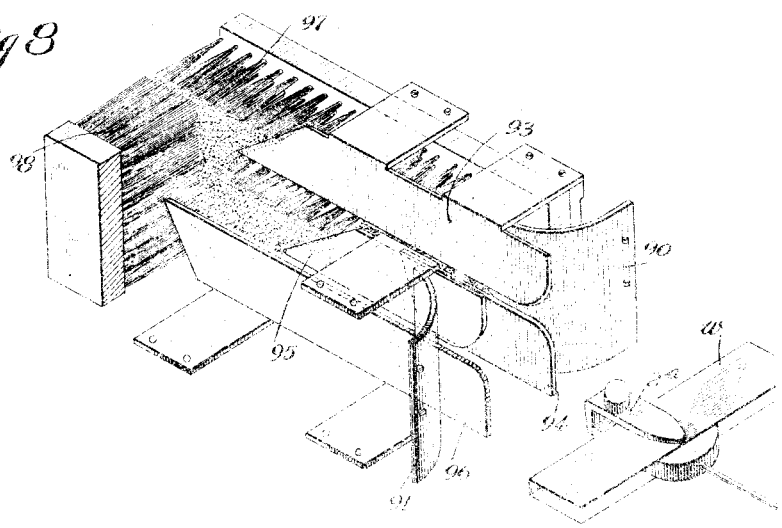

UNITED STATES PATENT OFFICE.

HENRY J. KEMPF, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

WRAPPING-MACHINE.

1,200,365.        Specification of Letters Patent.        Patented Oct. 3, 1916.

Application filed January 29, 1915. Serial No. 4,975.

*To all whom it may concern:*

Be it known that I, HENRY J. KEMPF, a citizen of the United States, residing at Springfield, in the county of Hampden and State of Massachusetts, have invented certain new and useful Improvements in Wrapping-Machines, of which the following description, in connection with the accompanying drawings, is a specification, like reference characters on the drawings indicating like parts in the several figures.

This invention relates to wrapping machines and will be herein disclosed as embodied in a machine designed particularly for wrapping "suckers" or "lollypops". These articles of confection usually consist of a disk of candy carried by a stem or stick which projects from one edge of the candy disk. The variations in design, size and shape of these articles, and the fact that they each have a stem and that the stems are likely to project at various angles with reference to the greatest dimension of the candy disk makes them particularly difficult articles to wrap by mechanical means. In fact there has never been a machine devised, so far as I am aware, for wrapping devices of this kind.

The solution of the difficulties presented by this state of facts, and the provision of a thoroughly practical machine for wrapping articles of this kind, constitute the chief objects of the present invention.

Referring now to the accompanying drawings, Fig. 1 is a plan view of a sucker wrapping machine embodying this invention; Fig. 2 is a central, vertical, sectional view of the machine shown in Fig. 1; Fig. 3 is a transverse, sectional view on the plane indicated by the line 3—3, Fig. 2, the chain and package holders being omitted; Fig. 4 is a plan view of the device that feeds the suckers to the wrapping mechanism; Fig. 5 is a sectional view of the sucker feeder and the mechanism for operating it; Fig. 6 is a rear elevation of the magazine for the suckers; Fig. 7 is a side elevation of certain parts of the paper feeding mechanism; Fig. 8 is an angular view showing a part of the wrapping mechanism; Fig. 9 is an angular view showing part of the sucker feeder and the wrapping mechanism adjacent to it; and Figs. 10 to 15, inclusive, are angular views showing the successive steps in the wrapping operations.

Briefly stated, the machine shown comprises a wrapping mechanism which includes a carrier supporting a series of holders, each holder being adapted to present a sucker to the operation of devices that fold the wrapper about the head or candy part of the sucker, leaving the marginal portions of the wrapper projecting about the sucker stem; crimping mechanism that wraps the projecting wrapper parts snugly about the sucker stem, and a twisting mechanism that twists the crimped portions of the wrapper snugly about the stem. The machine also includes a feeding mechanism which advances the suckers one at a time to the wrapping mechanism and which comprises a magazine in which the suckers are stacked and a feeder that carries the suckers one at a time from the magazine into their respective holders. A paper feeding mechanism positions a wrapper blank in the path of movement of each sucker as it is advanced by the feeder into one of the holders.

As just stated, the suckers are supported during the wrapping operation in a series of holders each indicated in general at 2. This series of holders is carried by a chain 3 which is mounted on two pairs of sprocket wheels 4 and 5, respectively. The wheels 4 are mounted rigidly on a horizontal shaft 6 supported in bearings formed in the machine frame 7 while the wheels 5 are rigidly mounted on a shaft 8, similarly supported in bearings in the machine frame. In order to drive the chain a pinion 9 is mounted fast on the shaft 8 at one side of the chain 3 and this pinion meshes with a gear 10 which is formed integrally with a Geneva wheel 11. A short shaft 12 (see Fig. 1) supports the parts 10 and 11. The driver for the geneva consists of a short arm 13 (see Fig. 2) mounted fast on one end of a shaft 14 and carrying a roll 15 which is adapted to enter the slots formed in the Geneva wheel, a part of the shaft 14 operating to stop the wheel as soon as the roll 15 ceases to drive it. On the opposite end of the shaft 14 a bevel gear 16 is secured which meshes with another gear 17 fast on a shaft 18 that is supported in bearings in the back of the machine frame. This shaft has secured to its forward end a bevel gear 19 meshing with a similar gear 20 fast on the main shaft 21 of the machine, this shaft being driven through a clutch that connects it with a driving pulley 22. A hand wheel 23 also is provided on the main shaft to enable an attendant to turn the machine over by hand.

The rotary motion given to the pair of sprocket wheels 5 by the mechanism just described causes it to drive the chain 3 step by step and the other pair of sprocket wheels 4 over which the chain runs are driven by the chain. Part of the wrapping mechanism is located adjacent to the upper stretch of the chain 3, and in order to prevent the chain from being deflected while the folding operations are being performed, two guides 25 and 26 are provided at opposite sides of the path of travel of this stretch of the chain. These guides are supported by brackets mounted on rods 27 that are sustained by the opposite sides of the machine frame. They are grooved on their adjacent faces, as indicated in Fig. 3, and the pins that connect adjacent links of the chain 3 are longer than the links are wide and each have rolls mounted on their opposite ends which run in the grooves of the guides 25 and 26.

The construction of the holders 2 is best shown at the left of Fig. 2 from which it will be seen that each holder consists of a pair of relatively thin jaws extending parallel to each other and parallel to the direction of movement of the chain. One jaw is stationary with reference to the chain and is formed integrally with a holder post 30 that is rigid with one of the links of the chain. The other jaw is movable and is mounted on a short rod 31 that telescopes within the post 30 and terminates in a head 32 which projects slightly from the lower end of the post. A spring 33, mounted within the hollow post 30, encircles the rod 31 and acts on the head 32 in a direction tending to force the movable jaw toward the stationary jaw or, in other words, to close the holder. Any rotary movement of one jaw with reference to the other is prevented by forming a flat face on the back of the post 30 and providing the movable jaw with a flattened projection 34 that slides on this flat face.

The suckers to be wrapped are stacked in a vertical magazine 36 comprising two curved plates mounted in vertical positions with their concave sides toward each other, leaving only a narrow slot at the front and back, and each supported by an arm 37 mounted on a bracket 38 forming part of the machine frame (see Fig. 6). The bottommost sucker in the magazine rests on a horizontal part of the bracket 38 which, in effect, forms the bottom of the magazine. In order to guide the stems of the suckers into position to enable the sucker feeder to carry the suckers into the wrapping mechanism, a pair of guides, indicated at 39, are secured to the members 36, respectively, near their lower ends and are inclined downwardly and inwardly toward each other, as shown in Figs. 1, 2 and 6, so that, as the suckers are fed out from the bottom of the stack and those higher up in the magazine drop to a lower level, the stems will be swung into the narrow slot separating the outer ends of the guides.

The sucker feeder comprises a long plate 40, best shown in Fig. 4, having a wide slot in its forward end to receive the head of a sucker, and a narrow rearward continuation of this slot, indicated at 41, which is designed to receive the sucker stem. The slot for the sucker head preferably is made longer than the head of the sucker which it is intended to accommodate so as to hold the sucker head out of contact with the wrapper, and two arms 42, extending horizontally in opposite directions from each other at the forward end of the feeder, are designed to coöperate with the wrapping mechanism to make the initial fold in the sucker wrapper. Because of the variations in dimensions and design of the suckers it will sometimes be necessary to change the feeder 40 and possibly also the magazine members 36 and 37 when shifting from one style of sucker to another differing radically from it in shape or dimensions. By making the slot or pocket in which the head of the sucker is received in the feeder of a greater length than the sucker head the feeder is enabled to protect the paper from being cut by the sharp fin that sometimes projects from the periphery of the sucker head. The accurate guiding of the sucker is facilitated by engaging the sucker head at opposite sides of the sucker stem as in the arrangement shown. The feeder 40 is given a reciprocating movement under the magazine 36 and over the flat face of the bracket 38 by means of a lever 44 fast on a rock shaft 45 extending parallel to the main shaft 21 of the machine and having fast thereon an arm 46 carrying a roll that runs in the camway of a rotary cam 47 mounted fast on the shaft 21. The lever 44 has a pin and slot connection with a lug depending from the bottom of the feeder 40, and another pair of lugs depending from the feeder slide on a pair of rods 48 which project from the back of the bracket 38 and guide the movements of the feeder. The sucker feeder 40 by bearing against the sucker head at the opposite sides of the stem, operates at each forward stroke to push the bottommost sucker in the magazine into one of the holders 2 which is waiting to receive it; and during its travel toward the holder the sucker picks up the wrapper in which the sucker head is to be inclosed. A paper feeding mechanism therefor is provided which operates to feed wrapper blanks one at a time into a position just in front of the feeder 40 where the operation just described can be effected. The wrapper blanks preferably are cut from a continuous strip of paper, foil or other wrapping material supplied from a roll 50 (see Fig. 1) which is supported on a rotatable reel 51 mounted at one side of the machine frame. This strip of wrapping material, which is indicated in Fig. 1 at S, is drawn from the roll 50, carried over a guide roll (not shown) mounted on the end of a pair of rods, one of which is shown at 52 in Fig. 1, this arrangement being like that common in machines of this character, and is then brought into a guideway 53 within reach of a gripper 54. This gripper is carried by a slide 56 which is mounted on a horizontal rod 57 supported by the machine frame 7, as shown in Fig. 1. The gripper comprises a stationary jaw rigid with the slide 56 and a movable jaw 58 pivoted to swing into an open or closed position with reference to the stationary jaw. This movement of the jaw 58 is effected by a pair of toggle links 59 and 60, Figs. 1 and 7, the link 59 being pivoted to the jaw 58 and the link 60 to a part of the slide 56. The two links, of course, are pivoted together. The arrangement is such that, when the toggle is straightened, as shown in Fig. 1, the gripper will be closed and when collapsed by a movement of the middle pivot of the toggle to the left as the parts appear in Fig. 1, the toggle will be collapsed and the gripper will be opened. The jaw 58 has considerable resiliency so that the gripper will grasp the wrapper with a yielding or spring pressure. The reciprocating movement of the slide 56 on the guide 57 is produced by a cam 62 rotating with the shaft 18 and operating one arm of a bell crank lever 63, the other arm of which is connected by a link 64 to the slide 56.

Assuming the parts to be in the positions shown in Fig. 1 with the gripper 54 at the backward limit of its stroke and grasping the end of the wrapper strip S, its forward movement will carry it past the front of the magazine to the opposite limit of its stroke, feeding the wrapper off the roll 51 and stretching the wrapper strip in front of the feeder 40. When the gripper has arrived at the forward limit of its stroke, a part of the toggle link 60 that projects below the gripper will strike the upturned lip of a stationary stop 66 (see Figs. 1 and 7) and collapse the toggle, thus opening the gripper 54 and causing it to release the wrapper. Just as the wrapper is being released a pair of shears 67, located near the guide 53 and between which the wrapper has been drawn by the gripper, are operated to cut the strip S and thus form a wrapper blank w. The shears 67 are operated by a pair of links 68 which connect the two blades of the shears with a cam follower 69, as shown in Fig. 2, this follower being operated by a cam 70 rotating with the main shaft 21. The wrapper blank w, which now rests on a pair of pins 71 supported in the front wall of a plate 75, is immediately picked up by the feeder 40 and carried into the folding chute. The gripper 54 then returns to its original position causing it to grasp the end of the wrapper strip that now projects just in front of the guide 53. In order to keep this strip from being drawn backwardly after it is severed by the shears 67, a pawl 73 is pivoted at one side of the guide 53 and has connected thereto a spring 74 which holds the end of the pawl constantly in contact with the strip S. This pawl is so positioned, as will be seen from an inspection of Fig. 1, that it does not hinder the forward or feeding movement of the strip but prevents any backward movement of it.

When the feeder 40 picks up the wrapper blank w and starts to carry it into one of the holders 2 it first moves the wrapper and the sucker between a pair of plates 75 and 76 which coöperate with the feeder 40 to make the initial fold in the wrapper about the sucker head. These plates are positioned one above the other, as shown in Fig. 2, and have their forward ends curved away from each other, as also shown in this figure, in order better to make the folds in the wrapper. Both of these plates are supported by bars that connect them with the machine frame and the plate 76 is slotted or is made in two sections, as shown in Fig. 1, and has metal portions 76' which are punched up or raised, this construction being provided to accommodate a sucker in which the stick or the stem is projecting at some unusual angle. Since the arms 42 of the feeder 40 project in front of the sucker head, they will protect the wrapper from contact with the sucker and, therefore, prevent the wrapper from being torn by any sharp edges which often are found on articles of this kind.

As the feeder 40 advances in the manner just described, the wrapper will be folded over the forward end and the top and bottom faces of the feeder, as shown in Fig. 10. In order to prevent the wrapper from twisting during this initial folding operation, the arms 42 of the feeder are drilled to receive pins 78 (Fig. 9) which are adjustably held therein by screws 79, and the points of these pins project through the forward faces of the arms 42 where they will pierce the wrapper just before the feeder strikes it. Two depending ears, one of which is shown at 80 in Fig. 9, project through apertures in the plate 76 and have slots directly opposite the respective pins 78 so that, as the pins move forward with the feeder 40 and pick up the wrapper w, the ears 80 will support or back up the wrapper at points directly opposite the pins 78 and insure the piercing of the wrapper by the pins which is desirable to keep the wrapper from twisting. Each ear 80 is mounted on a horizontal pivot mounted just above the plate 76 and is held yieldingly in its downward or depending position by means of a spring 81 so that, as the feeder moves forward, each ear 80 will be swung upwardly into its aperture in the plate 76 and thus will not interfere with the movement of the wrapper between the plates 75 and 76.

The feeder 40 carries the sucker between the plates 75 and 76 and into the holder indicated at $2^a$, Figs. 1, 2 and 8 with the wrapper w folded about the forward or "free" end (that is, the end opposite the stem) and over the two flat sides of the sucker head, as shown in Fig. 10. The jaws of the holder are opened to receive the sucker by means of a cam 83 fast on the shaft 18 which oscillates one end of a lever 84 fulcrumed on the machine frame at 85 (see Fig. 3) and has its other end connected by means of an adjustable link 86 to one end of a lever 87 which has threaded through its opposite end a bolt 88 arranged to strike the head 32 of the plunger 31 of each holder as it comes into the position occupied by the holder $2^a$. The cam 83 operates through the chain of connections just described to hold open the holder $2^a$ while the feeder 40 carries a sucker with the wrapper folded about it, as just described, through the forward end of the wrapper chute and forces it into said holder. The cam 83, however, only keeps the holder open for an instant; and as soon as the lever 87 is swung to move the bolt 88 out of contact with the head 32, the spring 33 closes the holder, causing it to grasp the sucker with the wrapper about it, as shown in Fig. 8.

The sucker is inserted in the lateral opening in the holder by a movement parallel to the direction of movement of the chain or support for the holder. When the holder is in the position $2^a$ the movement of the sucker into the holder or the next movement of the chain may cause the trailing part of the link that supports the holder to rise out of its seat in the sprocket wheels 5. In order to prevent any such movement a guard 89 (see Fig. 2) is arranged to cover the trailing pivot of the link while it is in the position $2^a$ and prevents any substantial upward movement of the link with relation to the sprocket wheels. As the sprocket wheels 5 are next moved to carry the holder 2 forward step by step, the holder presents the sucker to a series of folding devices that operate to make a "die fold" in the wrapper; that is, the fold which is made in pushing an article with a wrapper through a folding die, or folding box, of the ordinary construction like that, for instance, shown in the patent to Lazaga No. 710,474, granted October 7, 1902. These folding devices constitute, with the plates 75 and 76, the wrapper chute above referred to. The ends of the wrapper w first strike a pair of vertical plates 90 and 91 which are curved as shown in Figs. 1 and 8 so that the portions of the wrapper farthest from the sucker first strike the plates and gradually those portions nearer to the holder now in contact with the plates. These plates fold the projecting ends of the wrapper up into substantially the shape in which it is shown in Fig. 11, forming four upstanding folds or flaps, the two upper ones being shown at $a$ and $b$ and the lower ones at $c$ and $d$ in Fig. 11. It will be noted that the jaws of the holder 2 are so narrow that they cover only a small part of the head of the sucker and therefore do not interfere with any of the folding operations. The subsequent folding operations which serve to lay down the upstanding folds or flaps $a$, $b$, $c$, and $d$ preferably are all performed by brushes, a series of plates being provided to block off the bristles of the brushes at certain points and enable them to act on the wrapper only in the desired manner. This series of plates comprises two vertical plates 93 and 94, separated by a slot and mounted one above the other at one side of the path of travel of the sucker through the wrapper chute, and another similar pair of plates 95 and 96, mounted on the opposite sides of the path of travel of the sucker and having a slot between them. The rear surfaces of the plates 93 and 94 lie parallel to the surface of the rearward part of the curved plate 90 but are spaced slightly from it, and the corresponding surfaces of the plates 95 and 96 bear a similar relation to the rearward part of the plate 91. The slots between the members of the two pairs of vertical plates 93 and 94 on the one side and 95 and 96 on the other side is sufficient to permit the free passage of the wrapper at opposite sides of the head of the sucker.

It will now be evident that, while the sucker is moving past the curved plates 90 and 91, the portions of the wrapper close to the opposite sides of the sucker head will move into the slots between the plates 93 and 94 and the plates 95 and 96, respectively, and the flaps *b* and *c* (Fig. 11) will lie behind the plates 93 and 94 (or on the side opposite from the sucker) while the flaps *a* and *d* will lie behind the plates 95 and 96. As soon as these flaps move out of engagement with the curved plates 90 and 91, they will come into contact with the bristles of the two brushes 97 and 98 which are located behind the opposite sets of plates. These bristles will press the opposite pairs of wrapper flaps yieldingly against the rear faces of the adjacent plates and crease them preparatory to the subsequent folding operations. All of these plates and the brushes are supported by the guides 25 and 26, to which reference has been made above.

It will be evident from an inspection of Fig. 8 that the two plates 94 and 95, behind which lie, respectively, the flaps *c* and *a*, Fig. 11, are shorter than are the plates 93 and 96, behind which lie, respectively, the flaps *b* and *d*. It will also be noted that the rearward ends of these plates are inclined in a direction parallel to the forward edges of the respective flaps that lie behind these plates. Accordingly, as soon as the sucker has been moved forward far enough to bring the flap *a*, which lies behind the plate 95, to the forward edge of this plate, the bristles which project across this edge and into the space between the two pairs of plates will act on the flap *a* to lay it down or fold it over into the position in which it is shown in Fig. 12. At the same time, the bristles projecting beyond the forward edge of the plate 94 will fold over the flap *c* against the side of the sucker head. When the sucker has again been moved forward far enough to enable the bristles projecting beyond the ends of the plates 93 and 96 to act on the wrapper, they will fold down the flap *b* over the flap *a* as shown in Fig. 13, and the flap *c* over the flap *d*, thus completing the folding of the wrapper in a series of regular folds about the sucker head, and leaving the marginal portions of the wrapper all projecting in one direction and surrounding loosely the sucker stem.

The wrapping mechanism above described thus is operative to make regular folds in the wrapper, to partially inclose the sucker head therein, or in other words, it makes a predetermined number of folds in the wrapper about the sides of the sucker head, each of these folds having substantially a predetermined shape, and then turns these folds down one upon the other against the sucker head completely inclosing it except at the end in which the stick or stem is inserted.

The parts of the brushes 97 and 98 lying beyond the plates maintain the wrapper flaps in their folded positions while the sucker is passing through them. At the end of the brushes 97 and 98 a mechanism is provided which operates to wrap snugly about the sucker stem the wrapper flaps that project beyond the sucker head and lie loosely around the stem in the form of a tube. This mechanism comprises a pair of V-shaped jaws, indicated at 100 and 101, respectively, and which are mounted, respectively, on slides 102 and 103 both supported on a horizontal rod 104 extending across the machine frame. Two links 106 and 107 connect the respective slides 102 and 103 with a pair of bell crank levers 108 and 109, respectively, arranged in the form of a pair of scissors (see Fig. 3) and connected by links 110 to a cam follower 111 which is operated by a cam 112 fast on the shaft 18. One of the V-shaped jaws above mentioned is double, while the other is arranged to slide between the two members of this double jaw, as best shown in Fig. 2. As the sucker emerges from the brushes and passes between the jaws 100 and 101, which, at this time, are open, the jaws are moved toward each other by the connections with the cam 112 just described, and they grasp the projecting parts of the wrapper just at the base of the sucker head and crimp these portions of the wrapper around the sucker stem, as indicated in Fig. 14. The holder 2, of course, stops in a proper position to permit this operation and to permit the jaws to hold the wrapper in its crimped position for a sufficient length of time to cause the wrapper to "set" so that it will not unfold again as soon as it is released. For some purposes this wrapping might be sufficient but it is preferred to twist the crimped portions of the wrapper tightly about the sucker stem so that there will be no possibility of the sucker coming unwrapped accidentally. For this purpose a pair of twisters 114 and 115 are arranged to operate on the sucker when its holder has been moved around the sprocket wheels 4 to a position, indicated in Fig. 2 at 2ᵇ, diametrically opposite that in which the crimpers 100 and 101 operate on the wrapper. Each twister preferably is made of wire bent into substantially the form of a U (see Figs. 2 and 3). The ends of the U-shaped members are supported in spindles 116 and 117, respectively, mounted to rotate in a twister head 118; and the two twisters are crossed so that when the spindles 116 and 117 are turned in one direction the twisters will be opened into the position in which they are shown in Fig. 1; and when the spindles are turned in the opposite direction the twisters will be closed into the positions shown in Figs. 2 and 3. This movement of the twisters into open or closed position is produced by a shaft 120 mounted to slide in the twister head and having a grooved part 119 (see Fig. 2) that engages toothed portions on the spindles 116 and 117. A spring 121 acts on the shaft 120 in a direction tending to move it backward and thus to hold the twisters normally open. The twisters are closed by a cam 122 fast on the shaft 18 and having a raised portion adapted to engage a roll on one end of a lever 123, the opposite end of this lever having threaded therethrough a bolt 124 positioned in axial alinement with and close to the end of the shaft 120. When the raised part of the cam 122 strikes the roll on the lever 123, it causes the pin 124 to push the shaft 120 forward, and thus to close the twisters 114 and 115. As soon, however, as the cam has released the lever 123, the spring 121 again opens the twisters. The twisters are rotated by a train of gears comprising a pinion 125 that rotates with the twister head 118, a gear 126 meshing with the pinion 125, and fast on a shaft on which is also fixed another pinion 127 meshing with a gear 128 that is fast on a shaft with a geneva 129 operated by a Geneva driver formed on the back of the cam 122. The parts are so timed that the twisters are opened while one of the holders 2 is moving a sucker down into the position 2ᵇ in readiness for the twisting operation to be performed, and the twisters close and begin to rotate as soon as the sucker has been moved into this position. After the twisters have completed their operation they are again opened and stop rotating. While the chain 3 moves another step, carrying the sucker that has just been twisted out of operative relationship to the twisters and bringing another sucker into operative relationship to them. It will be noted that the free ends of the twisters are shaped to fit around the sucker stem, as indicated in Fig. 3.

The wrapping of the sucker has now been completed and appears substantially as shown in Fig. 15. The next operation is that required to release the sucker from the holder 2. This operation takes place while the holder is traveling around the pair of sprocket wheels 5 and is effected by the contact of the head 32 of the holder with a roll 130 which is mounted in the forward end of a stationary arm 132 that is secured to the bearings for the shaft 8 and the fulcrum on which the lever 87 rocks. As the holder 2 is moved past the roll 130 this roll, by its contact with the head 32, forces the plunger 31 of the holder outwardly, thus moving the upper jaw of the holder away from the lower jaw and allowing the sucker to fall out of the machine. Any suitable receptacle or chute may be provided to catch the suckers as they fall out of the holders.

The operation of the machine has been so fully explained in connection with the detailed description of the machine that any further statement of operation is believed to be unnecessary.

It is obvious that many changes in details and modifications of the specific construction shown may be made without departing from the spirit or scope of the invention. It will also be understood that some features of the invention are not limited to use merely in the wrapping of suckers, but may also be used to advantage in the wrapping of other articles. I believe, however, that I am the first to devise a machine for wrapping suckers or "lollypops," and that accordingly I am entitled to broad patent protection.

Having fully described my invention, what I claim as new and desire to secure by Letters Patent of the United States is:

1. In a machine of the character described, the combination with wrapping mechanism including means for making regular upstanding folds in a wrapper at the sides of the article to be wrapped, and means for folding them one upon the other against the article to inclose it in the wrapper except at one end, leaving the marginal portions of the wrapper all extending in one direction at said end, of means for twisting the projecting portions of the wrapper at said end to complete the inclosing of said article.

2. In a machine for wrapping suckers, the combination with a wrapping mechanism constructed and arranged to inclose the head of each sucker in a wrapper leaving the stem of the sucker projecting out of said wrapper, of sucker feeding mechanism operative to advance the suckers end-foremost one at a time to said wrapping mechanism with the stem of each sucker extending in a direction substantially parallel to the direction of said advancing movement.

3. In a sucker wrapping machine, the combination of means for folding a wrapper about the free end and the sides of a sucker head leaving the flaps of the wrapper projecting loosely about the sucker stem, and means for twisting said projecting flaps of the wrapper about said stem.

4. In a sucker wrapping machine, the combination of means for folding a wrapper about the free end and the sides of a sucker head leaving the flaps of the wrapper projecting loosely about the sucker stem, and means for acting on said projecting flaps to wrap them snugly about said stem.

5. In a sucker wrapping machine, the combination of means for folding a wrapper about the free end and the sides of a sucker head leaving the flaps of the wrapper projecting loosely about the sucker stem, devices for crimping said projecting flaps of the wrapper about the stem, and means operative thereafter to twist said flaps around the stem.

6. In a sucker wrapping machine, the combination of a holder constructed and arranged to hold a sucker head with a wrapper partially folded about it, and devices operative to fold the wrapper about the sides of the sucker head and to twist the wrapper flaps formed by the folding operations about the sucker stem while the sucker is in said holder.

7. In a sucker wrapping machine, the combination of a holder constructed and arranged to hold a sucker head with a wrapper partially folded about it, and devices operative to fold the wrapper about the sides of the sucker head and to wrap the flaps formed by the folding operations about the sucker stem while the sucker is in said holder.

8. In a sucker wrapping machine, the combination of a series of holders each constructed to hold a sucker with a wrapper partially folded about it, devices operative to fold the wrapper about the sides of the sucker head and to twist the wrapper about the sucker stem while the sucker is in the holder, a carrier supporting said holders for movement to present the suckers one at a time to the operation of said devices and to carry them away from said devices after the folding and twisting operations have been completed, and means for releasing the suckers from said holders.

9. In a sucker wrapping machine, the combination of a holder constructed and arranged to hold a sucker head with a wrapper partially folded about it, devices operative to fold the wrapper about the sides of the sucker head while it is in said holder and to leave the unfolded flaps of the wrapper projecting loosely about the sucker stem, twisters operative to twist said flaps around said stem while the sucker head is in said holder, and means for releasing the sucker from said holder.

10. In a sucker wrapping machine, the combination of a holder, means for positioning a wrapper blank adjacent to said holder, means for introducing a sucker and said wrapper blank into said holder in such a manner as to fold the wrapper about three sides of the sucker head, means operative to complete the folding of the wrapper about the sides of the sucker head while it is in said holder, and means for twisting the wrapper flaps formed by the folding operations around the sucker stem.

11. In a sucker wrapping machine, the combination of a movable carrier, a series of sucker holders mounted on said carrier, means for introducing successively into each of said holders a sucker with a wrapper folded about three sides of the sucker head, stationary folding devices in the path of said wrapper operative to complete the folding of the wrapper about the sides of the sucker head and to form wrapper flaps projecting loosely about the sucker stem, and means operative while the sucker is in said holder to twist said flaps about said stem.

12. In a machine of the character described, the combination of a wrapping chute, means for moving an article and a wrapper in contact therewith through said chute, said chute having brushes arranged to fold down the wrapper on opposite sides of the article in regular overlapping folds of the wrap and leave the marginal portions of the wrap per all projecting in one direction, and additional means operative to complete the inclosing of said article in said wrapper.

13. In a machine of the character described, the combination of a wrapping chute, means for moving an article and a wrapper in contact therewith through said chute, said chute having brushes arranged to fold down the wrapper on opposite sides of the article and form wrapper flaps overlapping each other and projecting at one end of the package, and devices operative after said folding operation has been completed to twist said flaps together.

14. In a sucker wrapping machine, the combination with a wrapping chute comprising devices adapted to fold a wrapper about three sides of the head of the sucker, and brushes arranged to complete the folding of the wrapper about the head of the sucker and forming wrapper flaps projecting around the sucker stem, of means for twisting the projecting flaps about the sucker stem.

15. In a machine for wrapping suckers, a wrapping mechanism having wrapper folding devices constructed and arranged to make regular upstanding folds in a wrapper about the sides of a sucker head and to fold them down one upon the other against the sucker head, and means for operating on the wrapper to dispose it snugly about the sucker stem adjacent to the sucker head but leaving said stem projecting out of the wrapper.

16. In a sucker wrapping machine, the combination with wrapping mechanism having a holder constructed and arranged to hold a sucker head with a wrapper partially folded about it and wrapper manipulating devices coöperating with said holder to inclose the head of the sucker in the wrapper while it is in said holder, of a sucker feeding mechanism constructed and arranged to deliver a sucker to said holder with the stem of the sucker extending in a predetermined direction with reference to the holder.

17. In a machine of the character described, the combination of means for folding a wrapper about an article to partially inclose it but leaving the wrapper projecting therefrom in the form of a tube, of V-shaped crimping jaws movable toward each other to engage said projecting portion and crimp the same, and away from each other to release the wrapper, and means for twisting the crimped portions of the wrapper.

18. In a sucker wrapping machine, the combination of a magazine arranged to hold a supply of suckers with their stems projecting in one direction, sucker wrapping mechanism, and means operative to engage the heads of the suckers at opposite sides of the sucker stems and carry them one at a time from the magazine to the wrapping mechanism.

19. In a sucker wrapping machine, the combination of wrapping mechanism, a feeder constructed to engage the head of a sucker and push it into the wrapping mechanism, said wrapping mechanism being arranged to coöperate with said feeder to fold the wrapper about the sucker head, and means carried by the feeder for preventing the wrapper from twisting while the initial folds are being made.

20. In a sucker wrapping machine, the combination with a wrapper positioning means, of sucker feeding mechanism including a plunger arranged to push a sucker into a wrapper positioned by said means, said plunger being recessed to receive the head of the sucker, and wrapping mechanism coöperating with said plunger to fold the wrapper about the head of each sucker, said feeding mechanism having means for maintaining the stem of each sucker in a predetermined relationship to the wrapping mechanism while it advances the sucker to said wrapping mechanism and while the initial folds in the wrapper are being made about the sucker head.

21. In a sucker wrapping machine, the combination with wrapping mechanism, of a sucker feeder comprising a plunger shaped to engage a sucker head at opposite sides of the sucker stem and having parts extending in front of the sucker head and adapted to coöperate with the wrapping mechanism to make the initial folds of the wrapper about the sucker head.

22. In a sucker wrapping machine, the combination with a wrapping mechanism, of a sucker feeder comprising a plunger shaped to receive a sucker head and having parts extending in front of the sucker head and adapted to coöperate with the wrapping mechanism to make the initial folds of the wrapper about the sucker head, and devices on said plunger operative to engage the wrapper and prevent it from twisting while the initial folds are being made.

23. In a sucker wrapping machine, the combination of a magazine adapted to contain a stack of suckers, a feeder operative to feed the bottommost sucker in the stack to the wrapping mechanism, said feeder being constructed to guide the heads of the suckers, and guides associated with said magazine and operative to guide the sucker stems into a predetermined relationship to said feeder.

24. In a sucker wrapping machine, the combination of a magazine adapted to contain a stack of suckers, a feeder operative to feed the bottommost sucker in the stack to the wrapping mechanism, said feeder being slotted to receive the suckers, and guides near the bottom of the magazine operative to guide the stems of the suckers into the slot in the feeder.

25. In a sucker wrapping machine, the combination with a wrapping mechanism, of a magazine adapted to contain a stack of suckers, said magazine having a slot through which the stems of the suckers may project and having guides arranged to hold the sucker stems in a predetermined position with relation to the wrapping mechanism.

26. In a sucker wrapping machine, the combination with wrapping mechanism, of sucker feeding mechanism operative to feed the suckers one at a time to said wrapping mechanism, said feeding mechanism including means constructed and arranged to engage the head of each sucker at opposite sides of the sucker stem.

27. In a sucker wrapping machine, a holder for a sucker comprising a pair of relatively thin jaws arranged to be opened or closed and operative to hold a sucker between them with a wrapper folded about three sides of the sucker head, supports rigid with said jaws, one of said supports being of tubular form and the other slidable in it, and a spring positioned within said tubular support and operative on said supports to hold the jaws normally closed.

28. A sucker wrapping machine, having in combination wrapping mechanism, a feeder operative to present suckers one at a time to said mechanism, and means for positioning the suckers for the action of said feeder with the stems of the suckers in a predetermined relationship to said feeder.

29. In a machine for wrapping suckers, the combination with a wrapping mechanism operative to inclose the head of each sucker in a wrapper, leaving the stem of the sucker projecting out of said wrapper, of a feeding mechanism constructed and arranged to advance suckers one at a time to said wrapping mechanism and to maintain the stem of each sucker extending in substantially a predetermined direction with reference to the elements of said wrapping mechanism.

30. A sucker wrapping machine, having in combination wrapping mechanism constructed and arranged to inclose a sucker head in a wrapper, leaving the stem projecting from said wrapper, said mechanism being operative to dispose the wrapper snugly about said stem, and means for presenting the suckers to be wrapped one by one to said mechanism.

31. A machine of the character described, having in combination a wrapping chute, and means for moving an article and a wrapper in contact therewith through said chute, said chute having brushes positioned therealong arranged to fold down the wrapper on the sides of the article in regular folds.

In testimony whereof I have affixed my signature, in presence of two witnesses.

HENRY J. KEMPF.

Witnesses:
  G. L. MASON,
  J. H. McCREADY.